3,720,766
Patented Mar. 13, 1973

3,720,766
INSECTICIDAL MIXTURES OF O,O-DIMETHYL-O-(2-METHOXY - 4 - CYANOPHENYL)-PHOSPHOROTHIOATE AND 3,4-METHYLENE DIOXYPHENYL PROPYNYLOXY CARBAMATES
Peter E. Letchworth, Mountain View, Calif., assignor to Stauffer Chemical Company, New York, N.Y.
No Drawing. Filed Aug. 3, 1970, Ser. No. 60,718
Int. Cl. A01n 9/02, 9/28, 9/36
U.S. Cl. 424—210    14 Claims

ABSTRACT OF THE DISCLOSURE

A composition of matter is described herein which is used as a synergist for O,O-dimethyl-O-(2-methoxy-4-cyanophenyl)-phosphorothioate insecticide and methods of use. The composition may be defined by the following generic formula

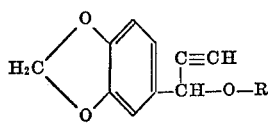

wherein R can be selected from radicals consisting of N-methyl carbamoyl, N-phenyl carbamoyl, N-p-chlorophenyl carbamoyl, benzoyl, acetyl, and 2-pyranyl.

BACKGROUND OF THE INVENTION

Among the many insecticidal compounds, the thiophosphates have reached a relatively high degree of commercial success. The thiophosphates are immediately toxic to a large number of insect pests at different concentrations varying with the resistance of the insects mentioned. Some of the thiophosphate compounds are described in British Pat. No. 1,094,215, specifically O,O-dimethyl-O-(2-methoxy-4 - cyanophenyl) phosphorothioate.

The endeavor to extend the usefulness of the thiophosphates by increasing their effectiveness and lowering their cost has led to extensive studies on another class of insecticidal material, customarily referred to as synergists. Among the many synergists employed, the alkyl oxides, specifically, piperonyl butoxide, have been widely used. These compounds are described in U.S. Pat. Nos. 2,485,681 and 2,550,737.

While these compositions enhance the usefulness of the thiophosphates, they do not measure up to the low cost that is desirable along with increased effectiveness.

BRIEF DESCRIPTION OF THE INVENTION

It has been discovered that the above described thiophosphate compositions having insecticidal activity can be greatly increased by using a synergist; therefore, having the following formula:

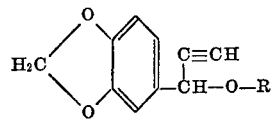

in which R is a radical selected from the group consisting of N-methyl carbamoyl, N-phenyl carbamoyl, N-p-chlorophenyl carbamoyl, benzoyl, acetyl, and 2-pyranyl.

DETAILED DESCRIPTION OF THE INVENTION

In the practice of the present invention, the synergistic compounds of the present invention are manufactured by reacting 1-propyne alcohol substituted at the 3rd position with certain vinyl ethers, acid chlorides or isocyanates. After the end products are achieved, they are isolated and purified and admixed with the insecticidal compositions. The amount of synergist admixed therewith can range from between about 1 to 0.1 to about 1 to 10 parts active compound to synergist composition. After the active compounds and synergists are mixed together, they are applied to a habitat in a conventional manner.

In order to illustrate the merits of the present invention, the following examples are provided:

EXAMPLE I

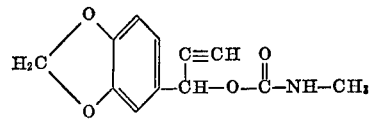

21 grams (0.12 mole) of 3-(3',4'-methylenedioxyphenyl)-propyne-3-ol was dissolved in 100 ml. of acetone containing about 0.1 gram of triethylene diamine and 0.1 g. of dibutyl tin dilaurate. Then, 8.5 g. of methyl isocyanate was added. The mixture was heated at reflux temperature for two hours, cooled and the acetone removed by evaporation under vacuum to give 27.5 g. of a solid product having a M.P. of between 75.5 and 77° C.

EXAMPLE II

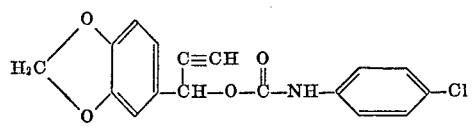

A mixture was formed containing 17.6 grams of 3-(3',4'-methylenedioxyphenyl)-propyne-3-ol (0.10 M), 15.4 g. of p-chlorophenylisocyanate, 50 ml. ether, 1 drop dibutyl tin dilaurate and 1 drop triethylamine. The reaction went to completion exothermically. The mixture was allowed to stand for 16 hours, wherein a small amount of solid was filtered off and discarded. The filtrate was evaporated to yield 27.1 g. of a solid product having a M.P. between 76 and 78° C.

EXAMPLE III

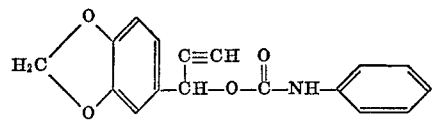

A mixture was formed containing 5.9 grams of 3-(3',4'-methylenedioxyphenyl)-propyne-3-ol (0.033 M), 50 ml. of ether, 4.0 g. of phenyl isocyanate and 1 drop of dibutyl tin dilaurate. The reaction went to completion slightly exothermically (to about 25° C.). The mixture was allowed to stand overnight, wherein a small amount of solid was filtered off and discarded. The filtrate was concentrated in a vacuum to yield 15.6 g. of an oil. $n_D^{30}$ 1.5687.

EXAMPLE IV

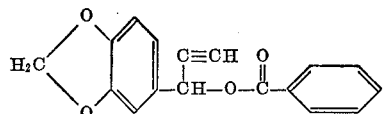

To the mixture of 3-(3',4'-methylenedioxyphenyl)-propyne-3-ol (0.033 M), 50 ml. of ether and 4.7 g. of benzoyl chloride was added 4.7 ml. of triethylamine over a period of 5 minutes with slight cooling. The resulting mixture was allowed to stand overnight and the mixture was then washed with water. The ether solution was dried over magnesium sulfate and evaporated in vacuum to yield 7.1 g. of an oil. $n_D^{30}$ 1.5793.

EXAMPLE V

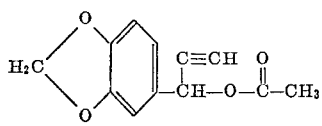

The procedure involved in Example IV as repeated in its entirety, except 2.50 ml. of acetyl chloride was used in place of the benzoyl chloride. 7.2 g. of an oil was the yield. $n_D^{30}$ 1.5420.

EXAMPLE VI

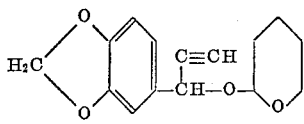

A mixture was formed containing 5.9 g. 3-(3',4'-methylenedioxyphenyl)-propyne-3-ol, 4.7 g. of dihydropyron, 50 ml. of benzene and 10 mg. of naphthalene sulfonic acid. The temperature was kept at 20-25° by slight cooling. After three hours, 1 teaspoon full of silica gel was added and the mixture filtered. The filtrate was evaporated in vacuum to yield 9.2 g. of an oil.

Insecticidal evaluation

The following procedure was used to test houseflies. A stock solution containing 100 μg./ml. of the toxicant in an appropriate solvent was prepared. Aliquots of this solution were combined with 1 milliliter of an acetone-peanut oil solution in a glass petri dish and allowed to dry. The aliquots were there to achieve desired toxicant concentration ranging from 100 μg. per petri dish to that at which 50% mortality was attained. The petri dishes were placed in a circular cardboard cage, closed on the bottom with cellophane and covered on top with cloth netting. Twenty-five female houseflies were introduced into the cage and the percent mortality was recorded after 48 hours. The LD-50 values are expressed in terms of μg. per 25 female houseflies. The results of these insecticidal evaluation tests are given in Table I.

TABLE I

Average $LD_{50}$ Values

Coded compound (Example I): μg./25 female houseflies
Thiophosphate [1] _____ 8.2
Thiophosphate [1]+piperonyl butoxide 1:10 ratio _ 4.2
Thiophosphate [1]+coded compound 1:10 ratio __ 2.2
Thiophosphate [1]+coded compound 1:5 ratio __ 2.7

[1] O,O-dimethyl-O-(2-methoxy-4-cyanophenyl)phosphorothioate.

What is claimed is:
1. An insecticidal composition comprising O,O-dimethyl-O-(2-methoxy-4-cyanophenyl) phosphorothioate and as a synergist therefor a compound having the formula

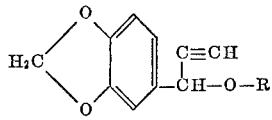

wherein R is a radical selected from the group consisting of N-methyl carbamoyl, N-phenyl carbamoyl, N-p-chlorophenyl carbamoyl, benzoyl, acetyl, and 2-pyranyl, said synergist being present in an amount ranging between about 1 to 0.1 to about 1 to 10 parts active insecticidal compound to synergist compound.

2. The composition of claim 1 wherein R is N-methyl carbamoyl.

3. The composition as set forth in claim 1 wherein R is N-phenyl carbamoyl.

4. The composition as set forth in claim 1 wherein R is N-p-chlorophenyl carbamoyl.

5. The composition as set forth in claim 1 wherein R is benzoyl.

6. The composition as set forth in claim 1 wherein R is acetyl.

7. The composition as set forth in claim 1 wherein R is 2-pyranyl.

8. The method of killing insects comprising applying to the habitat of said insects an insecticidally effective amount of the composition of claim 1.

9. The method of killing insects comprising applying to the habitat of said insects an insecticidally effective amount of the composition of claim 2.

10. The method of killing insects comprising applying to the habitat of said insects an insecticidally effective amount of the composiiton of claim 3.

11. The method of killing insects comprising applying to the habitat of said insects an insecticidally effective amount of the composition of claim 4.

12. The method of killing insects comprising applying to the habitat of said insects an insecticidally effective amount of the composition of claim 5.

13. The method of killing insects comprising applying to the habitat of said insects an insecticidally effective amount of the composition of claim 6.

14. The method of killing insects comprising applying to the habitat of said insects an insecticidally effective amount of the composition of claim 7.

References Cited

UNITED STATES PATENTS 2,485,681  10/1949  Wachs _____ 260—340.5
2,550,737   5/1951  Wachs _____ 424—188

FOREIGN PATENTS 1,094,215  12/1967  Great Britain.

ALBERT T. MEYERS, Primary Examiner
A. J. ROBINSON, Assistant Examiner

U.S. Cl. X.R.
424—282